United States Patent
Masuda

(10) Patent No.: US 10,136,051 B2
(45) Date of Patent: Nov. 20, 2018

(54) IMAGING APPARATUS FOR IMAGING DURING PANNING IMAGING WHEN A SELF-TIMER IS SET TO ON

(71) Applicant: CANON KABUSHIKI KAISHA, Tokyo (JP)

(72) Inventor: Yuta Masuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/668,617

(22) Filed: Aug. 3, 2017

(65) Prior Publication Data

US 2018/0041698 A1 Feb. 8, 2018

(30) Foreign Application Priority Data

Aug. 8, 2016 (JP) .................................. 2016-155232

(51) Int. Cl.
*H04N 5/232* (2006.01)
*H04N 5/225* (2006.01)

(52) U.S. Cl.
CPC ....... *H04N 5/23222* (2013.01); *H04N 5/2259* (2013.01); *H04N 5/23245* (2013.01); *H04N 5/23293* (2013.01)

(58) Field of Classification Search
CPC ............. H04N 5/23222; H04N 5/2259; H04N 5/23245; H04N 5/23293
See application file for complete search history.

(56) References Cited

U.S. PATENT DOCUMENTS

| 9,906,712 B2* | 2/2018 | Garcia Morate .. H04N 5/23222 |
| 2009/0079844 A1* | 3/2009 | Suzuki ................... G03B 13/36 348/222.1 |
| 2009/0244296 A1* | 10/2009 | Petrescu ............ H04N 5/23219 348/207.99 |
| 2016/0373647 A1* | 12/2016 | Garcia Morate .. H04N 5/23222 |
| 2017/0244938 A1* | 8/2017 | Al Mohizea ........... H04N 7/188 |

FOREIGN PATENT DOCUMENTS

| JP | 07-333724 A | 12/1995 |
| JP | 2015-52735 A | 3/2015 |

* cited by examiner

*Primary Examiner* — Nicholas G Giles
(74) *Attorney, Agent, or Firm* — Canon USA, Inc. I.P. Division

(57) ABSTRACT

A system control unit deactivates a self-timer imaging setting in a case where an imaging mode of panning imaging is set, an attitude detection unit has detected a movement of a main body corresponding to the panning imaging, or a panning imaging setting is ON.

16 Claims, 9 Drawing Sheets

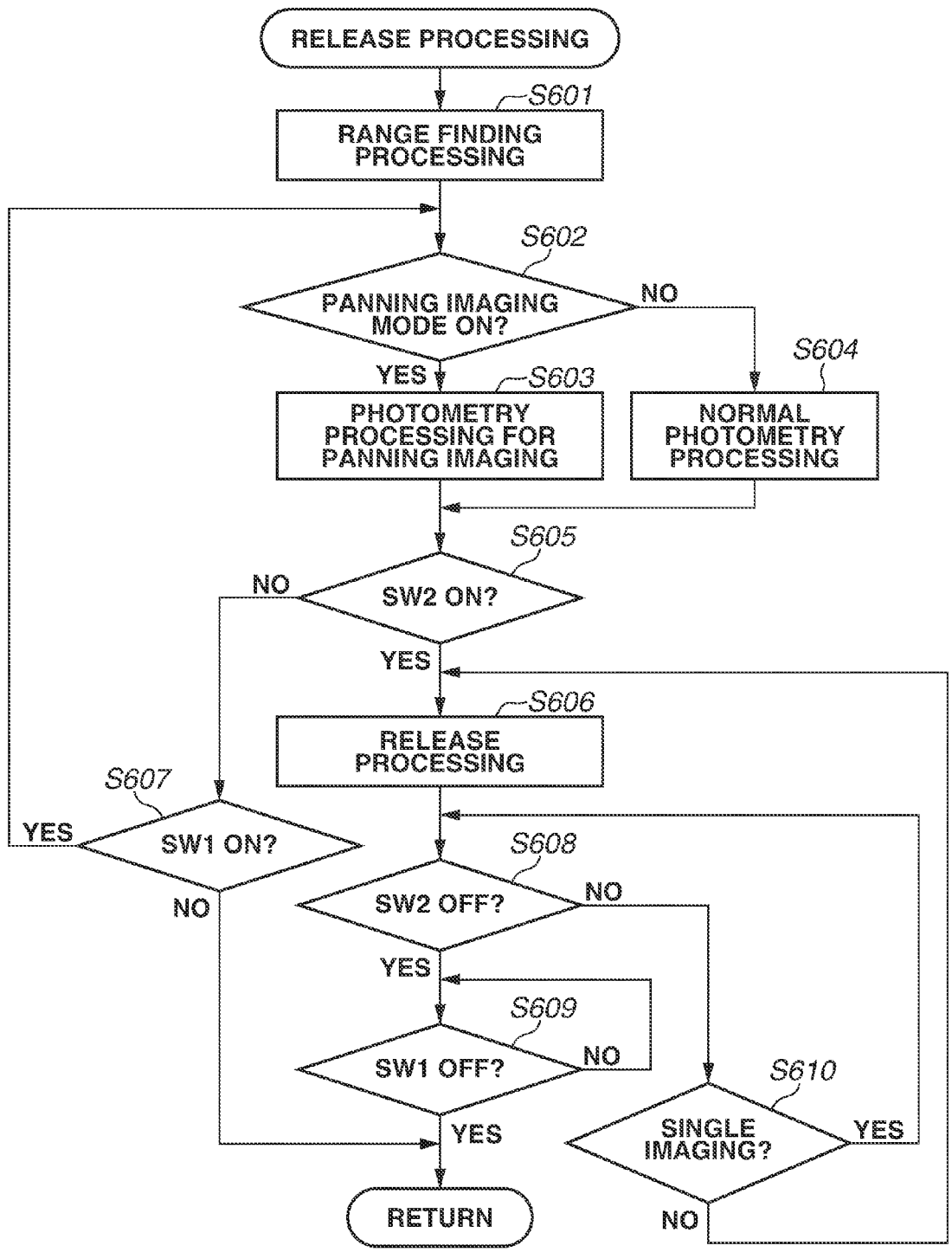

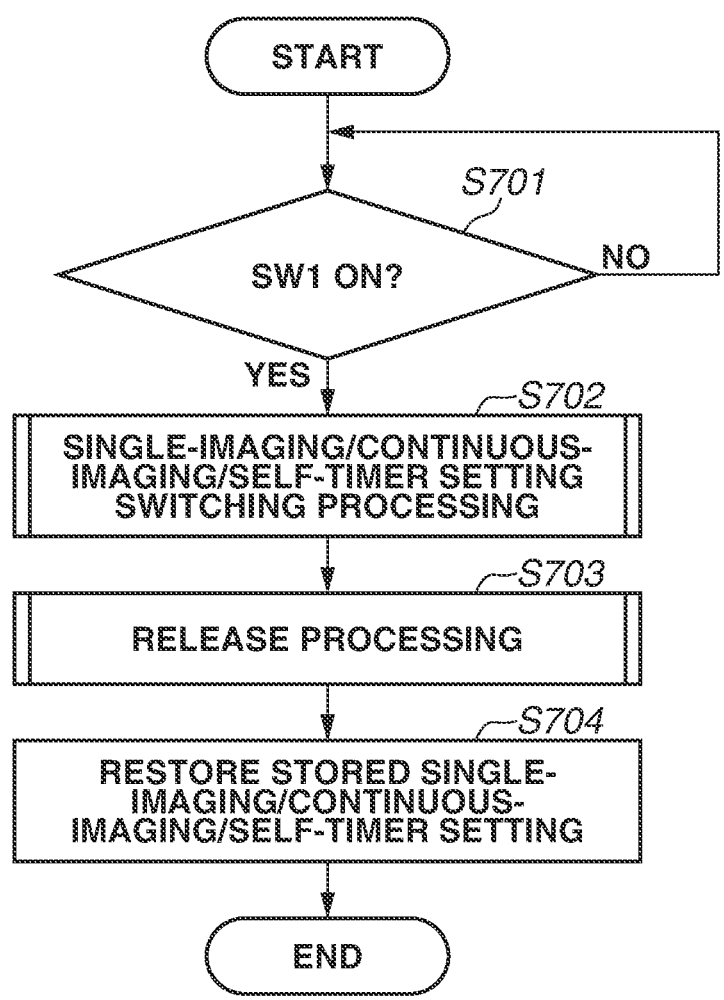

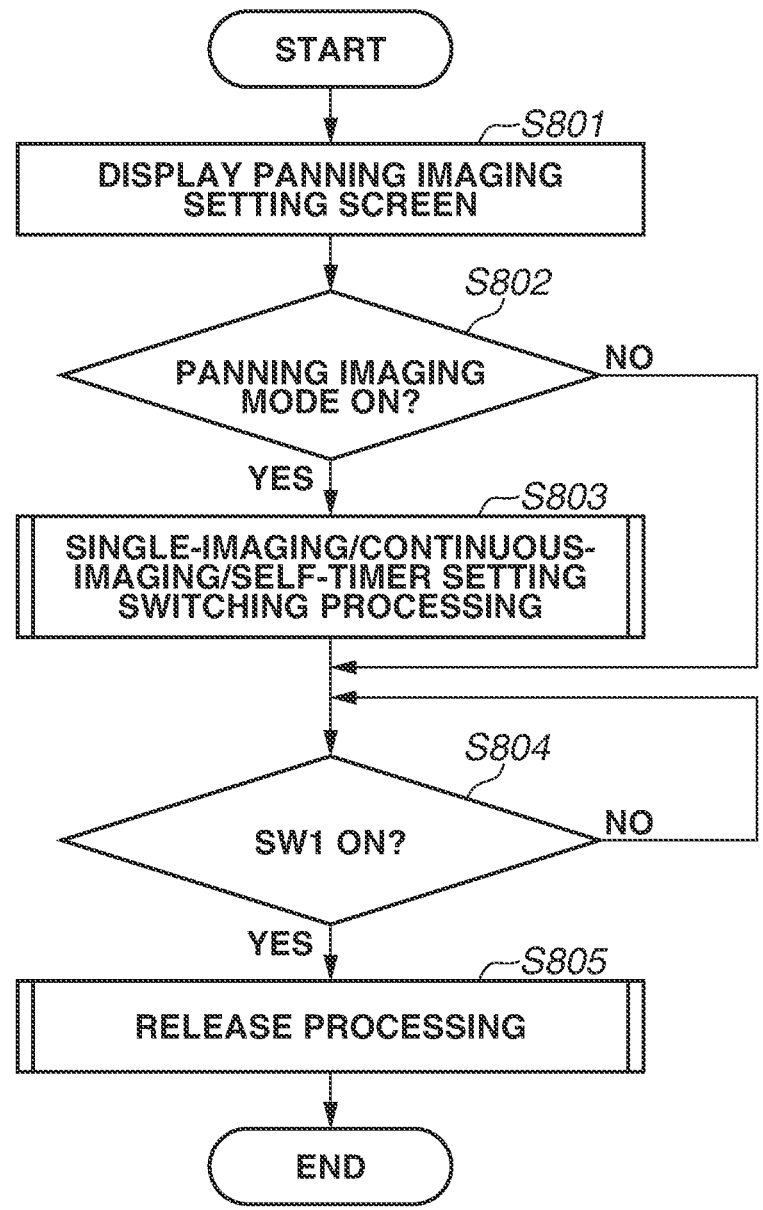

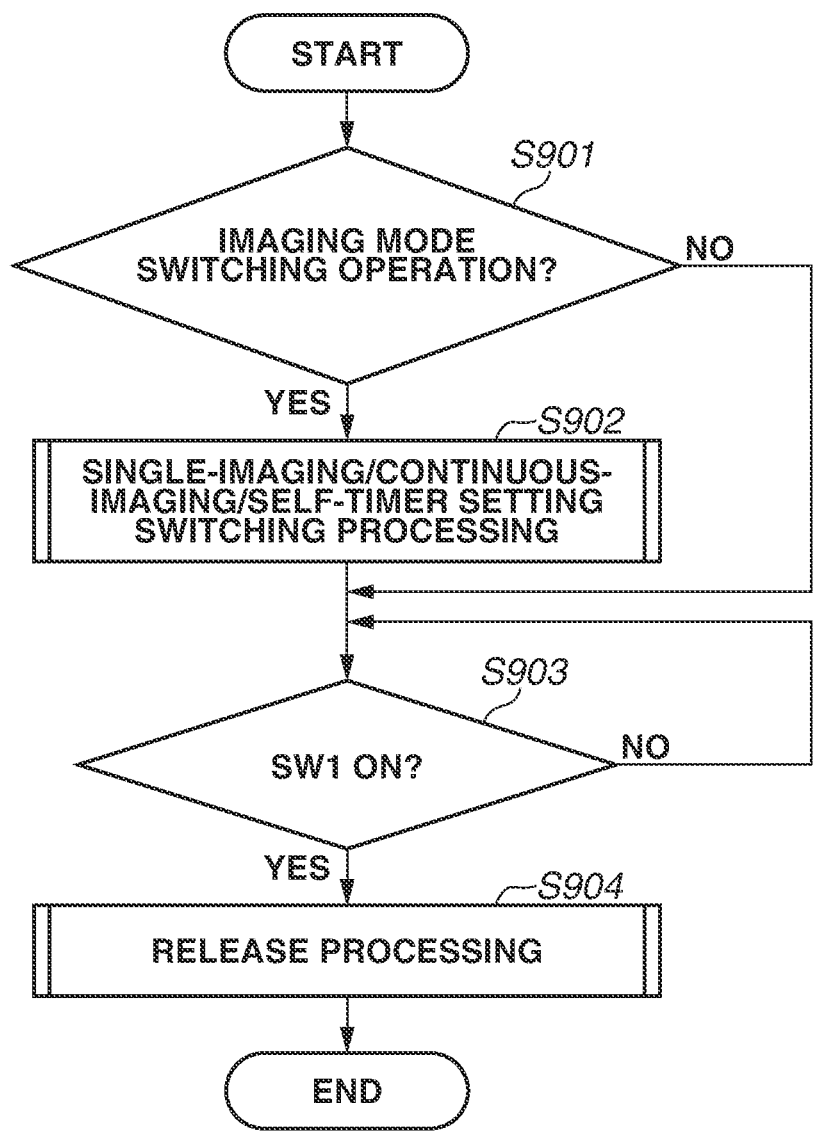

IMAGING APPARATUS FOR IMAGING DURING PANNING IMAGING WHEN A SELF-TIMER IS SET TO ON

BACKGROUND OF THE INVENTION

Field of the Invention

The present invention relates to an imaging apparatus, a method for controlling the imaging apparatus, and a storage medium, and particularly relates to an imaging apparatus, a method for controlling the imaging apparatus, and a storage medium with which panning imaging is performed.

Description of the Related Art

Capturing an image of a moving automobile, train, horse, or the like with an imaging apparatus held stationary only results in an image with a motion blur of the moving object in the moving direction. A panning imaging is known as an imaging method to address this in such a manner that an orientation of the imaging apparatus is changed in accordance with the movement of the moving object. With the panning imaging, a moving object is prevented from blurring but the image of a background portion is blurred.

Japanese Patent Application Laid-Open No. 2015-52735 discusses a panning imaging supporting function for panning imaging performed with an imaging apparatus including an image blur correction optical element for camera shake correction. The panning imaging supporting function supports the panning imaging with the image blur correction optical element controlled in such a manner that an imaging optical axis turns in a panning imaging direction.

Meanwhile, what is known as self-timer imaging is a built-in function of most commercially available imaging apparatuses. When the self-timer imaging is set to be ON, an image is captured when a predetermined period elapses (for example 10 seconds) after a shutter release operation was performed. Japanese Patent Application Laid-Open No. H07-333724 discusses a technique of canceling the self-timer imaging, when vibrations of an imaging apparatus are detected while a self-timer is operating.

A user may miss an imaging chance while the panning imaging is performed in a state where the self-timer function is active. As the panning imaging target is moving, a risk of large loss may increase for the user who has failed the imaging.

When the technique discussed in Japanese Patent Application Laid-Open No. H07-333724 is employed in this context, the self-timer imaging is canceled with vibrations detected due to the movement of the imaging apparatus for the panning imaging. Thus, the technique is not effective in reducing the risk that a user might miss an imaging chance.

SUMMARY OF THE INVENTION

The present invention is directed to an imaging apparatus with which a user can be free of a risk of missing an imaging chance during panning imaging without noticing whether a self-timer setting is ON.

According to an aspect of the present invention, an imaging apparatus includes an imaging instruction unit configured to issue an imaging instruction, an imaging unit configured to perform imaging in response to a reception of the imaging instruction issued by the imaging instruction unit, a switching unit configured to switch a panning imaging assistance function to be activated and deactivated, and a control unit configured to perform control in such a manner that when the panning imaging assistance function that has been inactive is activated in a state where a self-timer setting is ON and the imaging instruction is received, the imaging is performed without counting down of a self-timer.

Further features of the present invention will become apparent from the following description of exemplary embodiments with reference to the attached drawings.

BRIEF DESCRIPTION OF THE DRAWINGS

FIG. 6 is a control flowchart during release processing.

FIG. 7 is a control flowchart during an imaging.

FIG. 8 is another control flowchart during an imaging

FIG. 9 is yet another control flowchart during an imaging.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1:
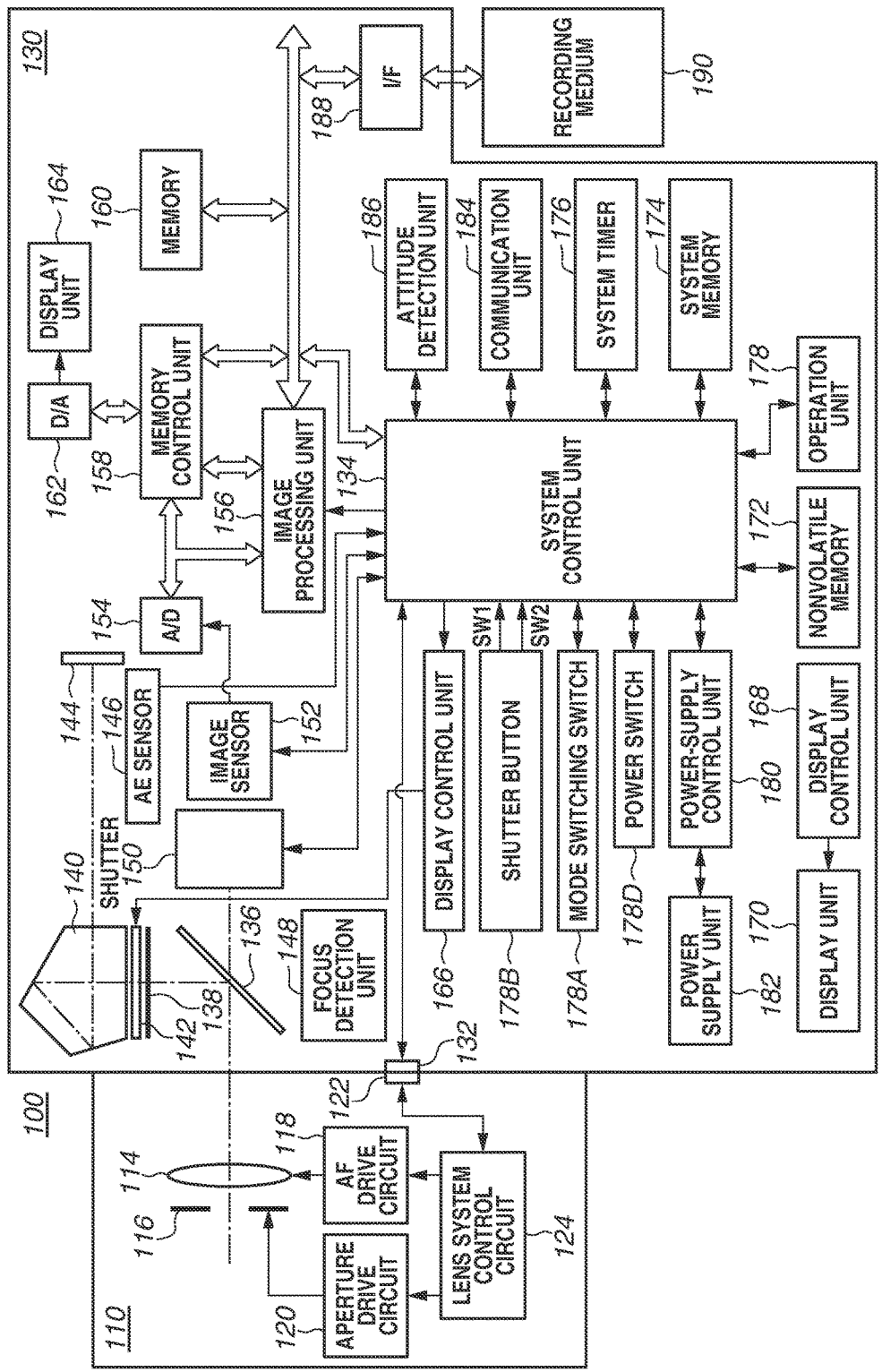
FIG. 1 is a block diagram schematically illustrating a configuration of a digital camera 100.
Figure 2A:
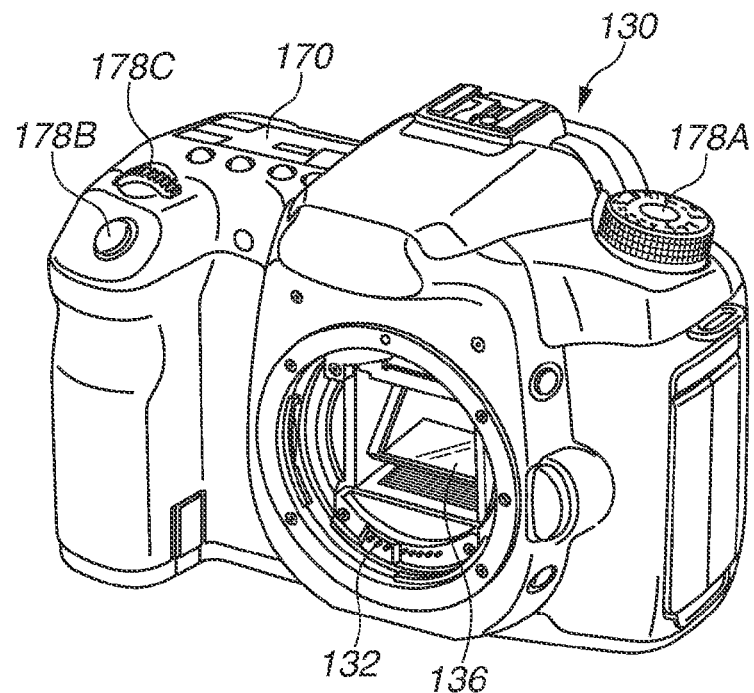
FIGS. 2A and 2B are perspective views each illustrating an outer appearance of the digital camera 100.
Figure 2B:
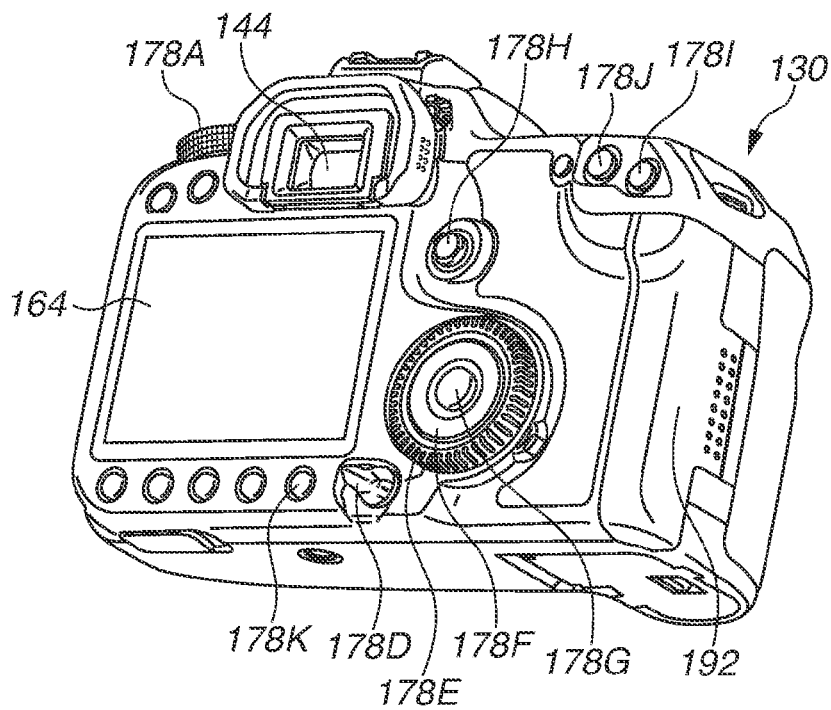

FIG. 1 is a block diagram illustrating a schematic configuration of a digital camera 100 as an example of an imaging apparatus according to an exemplary embodiment of the present invention. The digital camera 100 is what is known as a single-lens reflex camera in which a lens unit 110 can be attached to and detachable from a main body 130, and performs recording and reproducing of captured image data in and from a recording medium 190. FIG. 2A and FIG. 2B are respectively a front perspective view and a rear perspective view of the digital camera 100.

The lens unit 110 includes a lens 114 and an aperture 116, as optical elements. The lens 114 includes a plurality of lenses such as a focusing lens and a zoom lens, but is illustrated as a single lens in FIG. 1. An auto-focus (AF) drive circuit 118 drives the focusing lens in the lens 114 in an optical axis direction. An aperture drive circuit 120 drives the aperture 116 to achieve a designated opening rate. The lens unit 110 has a connection terminal 122 electrically connected to a connection terminal 132 of the main body 130, in the state of the lens unit 110 being attached to the main body 130. A lens system control circuit 124 communicates with a system control unit 134 of the main body 130 via the connection terminals 122 and 132. The lens system control circuit 124 adjusts focus of the lens unit 110 with the AF drive circuit 118 and adjusts an aperture value with the aperture drive circuit 120, according to an instruction from the system control unit 134.

Object light that has transmitted through the lens unit 110 is incident on a quick return mirror 136 (hereinafter, referred to as a "mirror 136") of the main body 130. The mirror 136 is at a position illustrated in FIG. 1 during non-imaging, to deflect the object light from the lens unit 110 upward so that an object optical image is formed on a focusing screen 138. A liquid crystal panel 142 for displaying imaging parameters such as a shutter speed and the aperture value is disposed between the focusing screen 138 and a pentaprism 140. A viewfinder 144 enables a user to check framing and an in-focus level with the object optical image on the focusing screen 138 and to check an imaging parameter value displayed on the liquid crystal panel 142 at the same time.

An automatic exposure (AE) sensor 146 for measuring a luminance of an object is disposed in the vicinity of the pentaprism 140. The system control unit 134 determines the aperture value of the aperture 116 and the shutter speed, based on an output from the AE sensor 146.

The mirror 136 has a center portion formed of a half mirror. Light transmitted through the half mirror is incident on a focus detection unit 148. For example, the focus detection unit 148 employs a phase difference system to detect whether the lens unit 110 is focused at a target object. The system control unit 134 controls the in-focus level of the lens unit 110 via the lens system control circuit 124, in accordance with a focus detection value obtained by the focus detection unit 148.

During imaging, the system control unit 134 flips up the mirror 136 with its upper end as a center. With this operation, the object light that has transmitted through the lens unit 110 is incident on a shutter 150 disposed behind the mirror 136 and is incident on an image sensor 152 while the shutter 150 is open. It is well known that the system control unit 134 opens the shutter 150 and keeps the open state of the shutter 150 while the image sensor 152 is to be exposed. For example, the shutter 150 includes a focal plane shutter. Instead of the shutter 150 as a mechanical shutter, an electronic shutter system may be employed. With this system, an exposed time of the image sensor 152 may be controlled by controlling discharging timing of charges accumulated in the image sensor 152.

The image sensor 152 includes an image sensor such as a charge coupled device (CCD) sensor or a complementary metal oxide semiconductor (CMOS) sensor that converts an optical image into an electric signal. An analog to digital (A/D) converter 154 converts an analog signal output from the image sensor 152 into a digital signal.

The image processing unit 156 executes predetermined pixel interpolation processing, resize processing such as reduction of size, and color conversion processing on image data from the A/D converter 154 or the memory control unit 158. The image processing unit 156 executes predetermined calculation processing on captured image data, and a calculation result thus obtained can be used by the system control unit 134 to perform exposure control and measurement control. In this way, AF processing, AE processing, and blink pre-emission (EF) processing based on a through-the-lens (TTL) system are performed. The image processing unit 156 further executes predetermined calculation processing on the captured image data, and can use a calculation result thus obtained to execute auto-white balance (AWB) processing based on the TTL system.

Output data from the A/D converter 154 is written to a memory 160 via the image processing unit 156 and the memory control unit 158, or directly via the memory control unit 158. The memory 160 stores image data obtained by the image sensor 152 and converted into digital data by the A/D converter 154, and also stores image data to be displayed on a display unit 164. The memory 160 has a large capacity sufficient to store a predetermined number of still images, as well as movies and sounds of a predetermined time.

The memory 160 also serves as an image display memory (video memory). A digital to analog (D/A) converter 162 converts display image data stored in the memory 160 into an analog signal to be supplied to the display unit 164. Thus, the display unit 164 displays an image corresponding to the display image data written to the memory 160. The display unit 164 functions as an electronic view finder by supplying image signals obtained with the image sensor 152, sequentially to the display unit 164 via the A/D converter 154, the memory 160, and the D/A converter 162. The display unit 164 has a live view display function of displaying what is known as a through image.

A display control circuit 166 displays a frame (AF frame) indicating a current auto-focusing point and an icon indicating a setting status of the camera, on a screen of the liquid crystal panel 142, according to an instruction from the system control unit 134. A display control circuit 168 displays various setting values, such as a shutter speed, an aperture vale, and an operation mode, on a liquid crystal panel 170 disposed on an upper surface of the main body 130, according to the instruction from the system control unit 134.

A nonvolatile memory 172 is an electrically erasable and recordable memory, and is, for example, an electrically erasable programmable read-only memory (EEPROM) or the like. The nonvolatile memory 172 stores a constant, a program, and the like used for operating the system control unit 134. The program herein causes the system control unit 134 to implement operations described below with reference to flowcharts and the like.

The system control unit 134 includes one or more processors that control the entire digital camera 100. The system control unit 134 executes a control program stored in the nonvolatile memory 172 to implement various types of processing described below. The system memory 174 includes a random access memory (RAM). The constant and a variable for the operation of the system control unit 134 as well as the program read from the nonvolatile memory 172, and the like are loaded onto the system memory 174. The system control unit 134 controls a display on the display unit 164 by controlling the memory 160, the D/A converter 162, the display unit 164, and the like.

A system timer 176 is a time measurement unit that measures a time used for various types of control and a time indicated by an internal clock.

The user can use an operation unit 178 to input various instructions to the system control unit 134. The operation unit 178 includes a plurality of mechanical switches 178A to 178K disposed on the main body 130.

A mode switching switch 178A is used for switching the operation mode of the system control unit 134 between a still image recording mode, a movie imaging mode, a playback mode, and the like. The still image recording mode has sub modes including an auto imaging mode, an auto scene discriminating mode, a manual mode, an aperture priority mode ($A_v$ mode), and a shutter speed priority mode ($T_v$ mode). Furthermore, the sub modes further include various scene modes each serving as an imaging setting for a corresponding imaging scene, a program AE mode, a custom mode, and the like. Any one of the modes and the sub modes can be set with the mode switching switch 178A. The mode switching switch 178A may shift a screen including a list of imaging modes, and then another operation member may be used to switch between a plurality of displayed modes and select a mode. Similarly, the movie imaging mode may include a plurality of modes (sub modes).

A shutter button 178B incorporates a first switch that turns ON when a button operation is halfway completed, that is, when the button is half pressed (imaging preparation instruction), and a second switch that turns ON when the button operation is fully completed, that is, when the button is fully pressed (imaging instruction). The shutter button 178B generates a first shutter switch signal SW1 when the first switch turns ON, and generates a second shutter switch signal SW2 when the second switch turns ON. The first shutter switch signal SW1 causes the system control unit 134 to start operations such as the AF processing, the AE processing, the AWB processing, the EF processing, and the like. The second shutter switch signal SW2 causes the system control unit 134 to start an operation as a series of imaging processing from reading of a signal from the image sensor 152 and to writing of image data to the recording medium 190.

An electronic main dial 178C is a rotational operation member, and can be rotated to change setting values of the shutter speed and the aperture value. A power switch 178D is used for instructing the system control unit 134 to turn ON or OFF the digital camera 100. An electronic sub dial 178E is a rotational operation member that can be used for moving a selection frame, image forwarding, and the like. A cross key 178F includes a four-way operational key with upper, lower, left, and right portions that can be individually pressed, so that an operation corresponding to the operated portion can be input to the system control unit 134. A SET button 178G is configured of a push button that is mainly used for confirming the selected items.

An LV button 178H is a button for turning ON and OFF the live view (LV) in a menu button, and is used for instructing start and stop of movie imaging (recording) in the movie imaging mode.

A zoom button 178I is used for issuing an instruction, indicating ON or OFF of a zooming mode in the live view display during the imaging mode, and change in a magnification rate in the zooming mode, to the system control unit 134. During the play back mode, the button can be operated to enlarge a reproduced image and increase a magnification rate. A reduction button 178J is an operation unit with which the system control unit 134 is instructed to reduce the magnification ratio of the enlarged reproduced image and reduce the display image.

A playback button 178K is an operation button for switching between an imaging mode and a playback mode. When the user presses the playback button 178K during the imaging mode, the system control unit 134 transitions to the playback mode, and thus the latest image of images recorded in the recording medium 190 is displayed on the display unit 164.

The operation unit 178 further includes a touch panel disposed on the screen of the display unit 164. When each of various function icons, displayed on the display unit 164, is selected and operated, an operation instruction assigned to the function icon can be input to the system control unit 134. Examples of the function icons include an end button, a return button, an image forwarding button, a jump button, a depth-of-field preview button, and an attribute change button. For example, when a menu button is pressed, various setting menu screens are displayed on the display unit 164. The user can perform various settings on the menu screen displayed on the display unit 164, with the function buttons on the screen, the cross key 178F, and the SET button 178G.

A power-supply control unit 180 includes a battery detection circuit, a direct current (DC)-DC converter, and a switch circuit with which an energized block is switched, and detects whether a battery is attached, the type of the battery, and a remaining battery level. The power-supply control unit 180 controls the DC-DC converter based on the result of the detection and an instruction from the system control unit 134, so that required voltage can be supplied to portions including the recording medium 190 for a required time period. A power supply unit 182 includes a primary battery such as an alkaline battery or a lithium battery, a secondary battery such as a nickel cadmium (NiCd) battery, a nickel-metal hydride (NiMH) battery, and a lithium (Li) battery, or an alternate current (AC) adaptor.

A communication unit 184 can transmit and receive a video signal, a sound signal, and the like with another apparatus through wireless communication or wired communication using a cable. The communication unit 184 can also be connected to a wireless local area network (LAN) or the Internet. The communication unit 184 can transmit an image obtained with the image sensor 152 (including a through image) and an image recorded in the recording medium 190, and can also receive image data and various other types of information from an external apparatus.

An attitude detection unit 186 detects an attitude and a movement of the digital camera 100 relative to a direction of gravity. The system control unit 134 can determine whether the image obtained by the image sensor 152 has been captured with the digital camera 100 held vertically or horizontally, based on the attitude detected by the attitude detection unit 186. The system control unit 134 can rotate and record a captured image, with the information on the attitude detected by the attitude detection unit 186 added to an image file of the captured image. The system control unit 134 can determine whether the digital camera 100 is panning, tilting, moving in a front or rear direction, or the like, based on a detection output from the attitude detection unit 186. The attitude detection unit 186 may be configured of an acceleration sensor, a gyro sensor, or the like.

The recording medium 190, such as a memory card or a hard disk, is connected to a recording medium interface 188. The recording medium 190 is inserted into a slot, which is opened and closed with a lid 192, to be electrically connected to the recording medium interface 188.

In the present exemplary embodiment, a method of activating an assistance function for panning imaging is described. For example, imaging modes switchable with the operation unit 178 may include a panning imaging mode. The assistance function for the panning imaging is activated when the imaging mode is set to the panning imaging mode, and is turned OFF when the imaging mode is set to another imaging mode. Further, the panning imaging setting may be turned ON/OFF on a panning setting screen provided as one of the setting screens displayed on the display unit 164. The panning imaging assistance function is activated when the panning setting is set to be ON, and is deactivated when the panning setting is set to be OFF. For example, when the panning imaging assistance function is active, the system control unit 134 performs control in such a manner that a slower shutter speed of the shutter 150 is achieved, that blur correction in directions other than a panning imaging direction is achieved with an image blur correction optical element in the lens 114, or that both of these are achieved. Other methods are also considered. For example, the attitude detection unit 186 may detect a movement status of the main body 130, and the panning imaging assistance function may be activated when the main body 130 is determined to be moving in one direction at a constant speed. Alternatively, the panning imaging assistance function may be activated when the movement of the main body 130 in one direction at a constant speed is detected and determined by using an LV image. As described above, the panning imaging assistance function may be activated with various methods, and the present invention is not limited to any of such methods.

Figure 3:
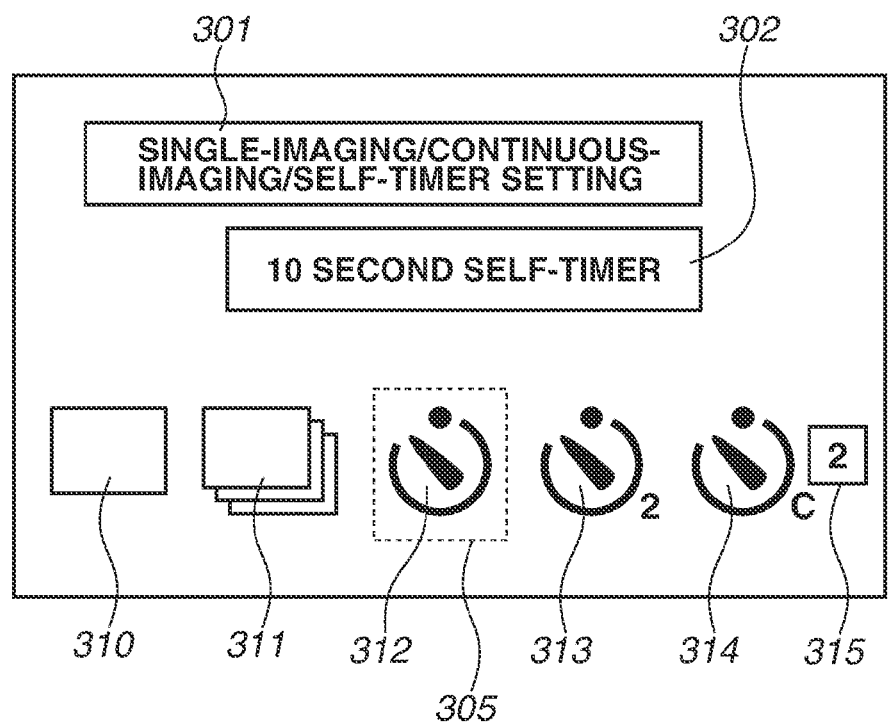
FIG. 3 is an example of a setting screen for setting a single-imaging/continuous-imaging/self-timer.

FIG. 3 illustrates an example of a single-imaging/continuous-imaging/self-timer setting screen for the still image capturing mode. A title 301 indicates the content of the setting screen. A description 302 indicates the content of a setting selected with a cursor 305. In the present exemplary embodiment, single or continuous-imaging based on a release operation by the user, or single or continuous-imaging based on release with a self-timer can be selected, as the release control setting.

The cursor 305 indicates one of selectable icons 310, 311, 312, 313, and 314 that has been selected.

The icon 310 represents a single-imaging setting. When the single-imaging setting is ON, the system control unit 134 controls the components so as to perform single-imaging.

The icon 311 represents continuous-imaging setting. When the continuous-imaging setting is ON, the system control unit 134 controls the components so as to perform continuous-imaging.

The icon 312 represents a 10 second self-timer setting. When the 10 second self-timer setting is ON, the system control unit 134 controls the components so as to execute release processing 10 seconds after a release start instruction is received.

The icon 313 represents a 2 second self-timer setting. When the 2 second self-timer setting is ON, the system control unit 134 controls the components so as to execute release processing two seconds after the release start instruction is received.

The icon 314 represents continuous-imaging self-timer setting. The setting value 315 represents a setting value indicting the number of images captured with the continuous-imaging self-timer setting. When the continuous-imaging self-timer setting is ON, the system control unit 134 controls each unit so as to execute the release processing 10 seconds after the release start instruction is received to capture images the number designated with the setting value indicated by the setting value 315.

In the single-imaging/continuous-imaging/self-timer setting illustrated in FIG. 3, the icons 310 to 315 the setting of which conflicts with another setting is preferably not selectable. At that time, such an icon in the icons 310 to 315 is preferably greyed out so that the user can recognize that the icon cannot be selected. Alternatively, when the cursor 305 is on the icon that cannot be selected, a message indicating that the icon cannot be selected may be displayed. When the panning imaging assistance function is active, the icons 312 to 314, among the single-imaging/continuous-imaging/self-timer setting, relating to the self-timer setting cannot be selected or may be selected but cannot be set (the confirmation operation is disabled), and therefore are greyed out (identifiable display). When the panning imaging assistance function is active, a guide display indicating that the panning imaging assistance function needs to be deactivated to turn ON the self-timer setting may be performed. For example, messages such as "set imaging mode other than panning setting mode to set self-timer" and "self-timer cannot be set when panning imaging mode is ON" may be displayed. Furthermore, a change in a display mode can be employed. For example, when the icons 312 to 314 relating to the self-timer setting are selected, the imaging mode icon corresponding to the panning imaging mode which is displayed without blinking in a normal situation may be blinked. When the panning imaging assistance function is inactive, the icons 312 to 314 relating to the self-timer setting can be selected and set. Processing executed, in a case where the panning imaging assistance function is inactive, after a setting corresponding to any one of the icons 312 to 314 relating to the self-timer setting is ON, and then the panning imaging assistance function is activated, is described below with reference to FIG. 5.

Figure 4:
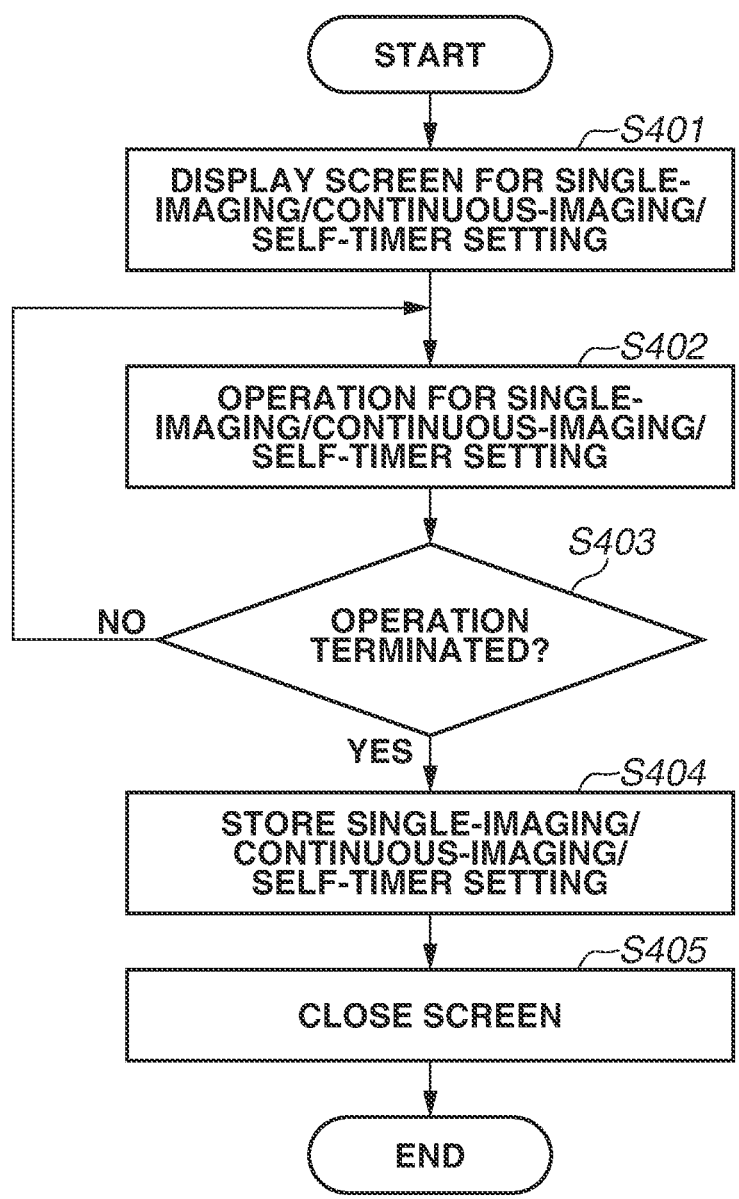
FIG. 4 is a setting operation flowchart of the single-imaging/continuous-imaging/self-timer.

FIG. 4 is a flowchart illustrating processing executed by the system control unit 134 for the single-imaging/continuous-imaging/self-timer setting illustrated in FIG. 3. The processing illustrated in FIG. 4 is implemented when the system control unit 134 loads a program corresponding to the flowchart illustrated in FIG. 4, stored in the nonvolatile memory 172, onto the system memory 174 and executes the program. The processing is executed when the user performs the single-imaging/continuous-imaging/self-timer setting, and starts when a display instruction operation on the single-imaging/continuous-imaging/self-timer setting screen is received.

In step S401, the system control unit 134 displays the detail setting screen illustrated in FIG. 3 for the single-imaging/continuous-imaging/self-timer setting on the display unit 164.

In step S402, the system control unit 134 receives selection by the user on the setting screen in FIG. 3. For example, the system control unit 134 moves the cursor 305 in accordance with a cursor movement operation with the operation unit 178. The setting value may be determined to be changed while the cursor 305 is moved or may be determined to be changed when the SET button 178G is pressed.

In step S403, the system control unit 134 determines whether a setting termination operation with the setting screen illustrated in FIG. 3 has been performed by the user. When the system control unit 134 determines that the termination operation has been performed (YES in step S403), the processing proceeds to step S404. On the other hand, when the system control unit 134 determines that the termination operation has not been performed (NO in step S403), the processing returns to step S402.

In step S404, the system control unit 134 stores a single-imaging/continuous-imaging/self-timer setting value. For example, the setting value thus stored is restored when the panning imaging assistance function is deactivated.

In step S405, the system control unit 134 closes the setting screen illustrated in FIG. 3, and displays the previous screen.

Figure 5:
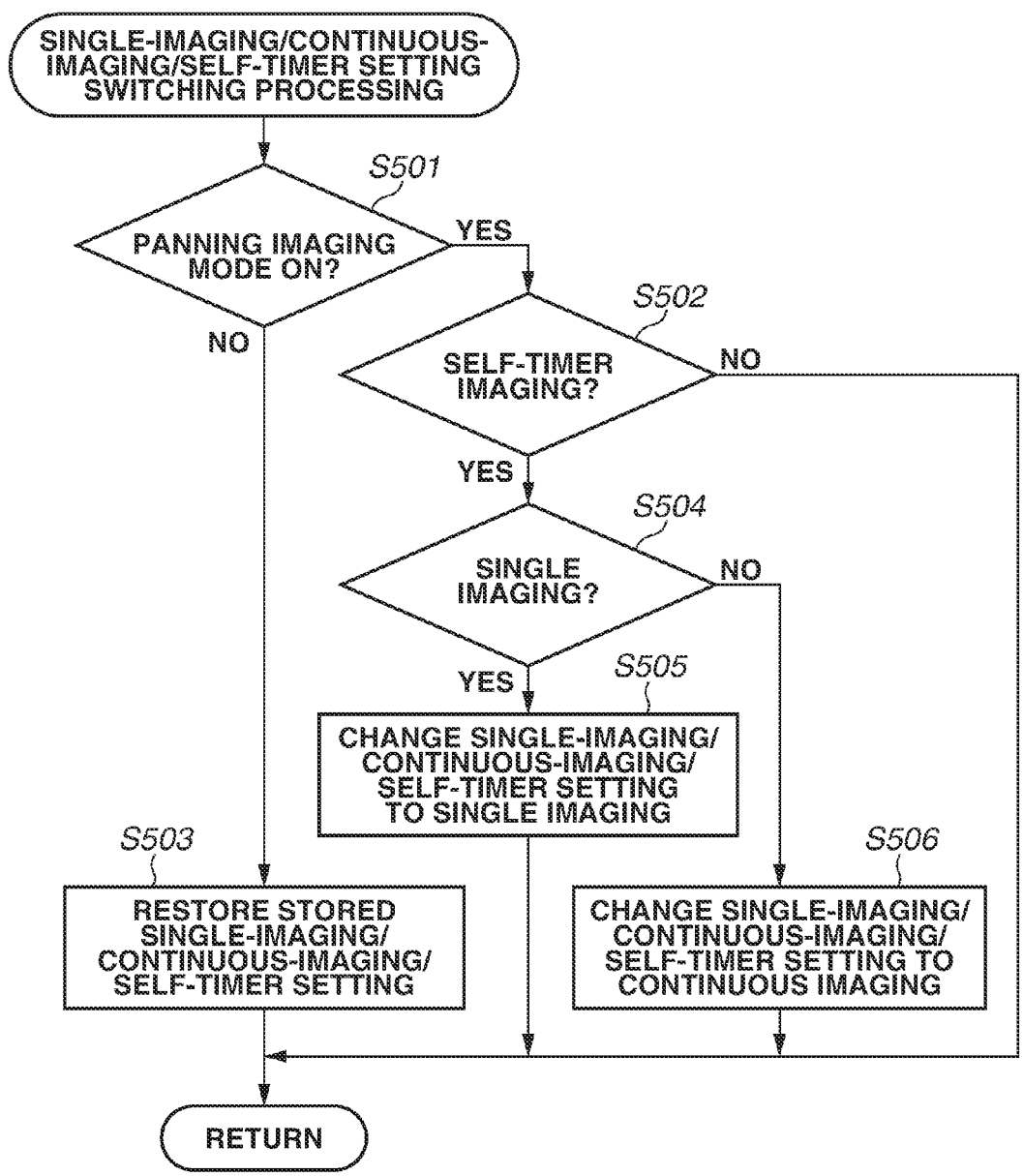
FIG. 5 is a control flowchart of setting switching processing of the single-imaging/continuous-imaging/self-timer.

FIG. 5 is a flowchart illustrating processing of automatically switching the single-imaging/continuous-imaging/self-timer setting of the digital camera 100, in accordance with whether the panning imaging is ON and with the single-imaging/continuous-imaging/self-timer setting value set through the processing illustrated in FIG. 4. The processing illustrated in FIG. 5 is implemented when the system control unit 134 loads a program corresponding to the flowchart illustrated in FIG. 5, stored in the nonvolatile memory 172, onto the system memory 174 and executes the program.

In step S501, the system control unit 134 determines whether the panning imaging assistance function is active. When the system control unit 134 determines that the panning imaging assistance function is active (YES in step S501), the processing proceeds to step S502. When the system control unit 134 determines that the panning imaging assistance function is inactive (NO in step S501), the processing proceeds to step S503.

In step S502, the system control unit 134 determines whether the current single-imaging/continuous-imaging/self-timer setting is self-timer imaging (single or continuous-imaging). When the system control unit 134 determines that the self-timer imaging (the setting corresponding to any one of the icons 312 to 314) is ON (YES in step S502), the processing proceeds to step S504. On the other hand, when the system control unit 134 determines that the self-timer imaging is OFF (NO in step S502), the processing illustrated in FIG. 5 is terminated.

In step S503, when a result of the determination in step S501 is NO due to the panning imaging assistance function that has been active is deactivated, the system control unit 134 restores the single-imaging/continuous-imaging/self-timer setting value stored in step S304. Through this operation, the single-imaging/continuous-imaging/self-timer setting value that has been set before the panning imaging can be restored when the panning imaging assistance function is deactivated. When the panning imaging assistance function has been inactive, the original setting is maintained. Then, the system control unit 134 terminates the processing illustrated in FIG. 5.

In step S504, the system control unit 134 determines whether the current single-imaging/continuous-imaging/self-timer setting is single-imaging self-timer or continuous-imaging self-timer. In the present exemplary embodiment, the single-imaging self-timer setting is 10 second self-timer setting or 2 second self-timer setting. When the system control unit 134 determines that the single-imaging self-timer is ON (YES in step S504), the processing proceeds to step S505. On the other hand, when the system control unit 134 determines that the continuous-imaging self-timer is ON (NO in step S504), the processing proceeds to step S506.

In step S505, the system control unit 134 changes the single-imaging/continuous-imaging/self-timer setting to the single-imaging setting (self-timer OFF), and terminates the processing in the flowchart illustrated in FIG. 5. In other words, the system control unit 134 cancels only the self-timer setting and maintains the single-imaging setting.

In step S506, the system control unit 134 changes the single-imaging/continuous-imaging/self-timer setting to the continuous-imaging setting (self-timer OFF), and terminates the processing in the flowchart illustrated in FIG. 5. In other words, the system control unit 134 cancels only the self-timer setting and maintains the continuous-imaging setting.

Alternatively, in steps S505 and S506, the single-imaging/continuous-imaging/self-timer setting may be always changed to the single-imaging or the continuous-imaging, regardless of the previous setting value.

FIG. 6 is a control flowchart of the release processing. The processing illustrated in FIG. 6 is implemented when the system control unit 134 loads a program corresponding to the flowchart illustrated in FIG. 6, stored in the nonvolatile memory 172, onto the system memory 174 and executes the program.

In step S601, the system control unit 134 executes AF processing as range finding processing.

In step S602, the system control unit 134 determines whether the panning imaging assistance function is active. When the panning imaging assistance function is active (YES in step S602), the processing proceeds to step S603. In step S603, the system control unit 134 executes photometry processing and AE processing for the panning imaging, and the processing proceeds to step S605. On the other hand, when the panning imaging assistance function is not active (NO in step S602), the processing proceeds to step S604. In step S604, the system control unit 134 executes normal photometry processing and AE processing, and the processing proceeds to step S605. In the AE processing, at least one of the shutter speed and the aperture value is determined and set based on the photometry result and a program line. Typically, a slower shutter speed is set for the panning imaging to capture a vivid and lively image of an object. By setting the slower shutter speed, expression with the background of the object motion blurred can be achieved. For this reason, in the panning imaging photometry processing/AE processing in step S603, a shutter speed slower than that of the normal imaging photometry processing/AE processing in step S604 is set for the panning imaging assistance function, when the photometry result is the same.

In step S605, the system control unit 134 determines whether the second shutter switch signal SW2 is ON. When the system control unit 134 determines that the second shutter switch signal SW2 is ON (YES in step S605), the processing proceeds to step S606. On the other hand, when the system control unit 134 determines that the second shutter switch signal SW2 is OFF (NO in step S605), the processing proceeds to step S607.

In step S607, the system control unit 134 determines whether the first shutter switch signal SW1 is ON. When the system control unit 134 determines that the first shutter switch signal SW1 is ON (YES in step S607), the processing returns to step S602. Then, the photometry processing in step S603 or S604 is repeated. Alternatively, the processing may return to step S601 instead of step S602 so that the range finding processing can also be repeated. For example, the processing preferably returns to step S601, when control such as servo AF in which the object is continuously followed is performed. On the other hand, when the first shutter switch signal SW1 is determined to be OFF (NO in step S607), the system control unit 134 terminates the processing illustrated in FIG. 6, and returns to the calling source.

In step S606, the system control unit 134 executes release processing (processing of capturing an image and recording the captured image as an image file) according to the range finding result obtained in step S601 and the photometry result obtained in step S603 or S604. When the self-timer setting is on in the single-imaging/continuous-imaging/self-timer setting, the exposure processing is executed after counting down of the self-timer is completed. When the panning imaging assistance function is active, the image is immediately captured when the switch SW2 is turned ON (when the shutter button is fully pressed) with no countdown performed because the self-timer setting has been turned OFF due to the processing described above.

In step S608, the system control unit 134 determines whether the second shutter switch signal SW2 is ON. When the system control unit 134 determines that the second shutter switch signal SW2 is ON (YES in step S608), the processing proceeds to step S609. On the other hand, when the system control unit 134 determines that the second shutter switch signal SW2 is OFF (NO in step S608), the processing proceeds to step S610.

In step S610, the system control unit 134 determines whether the single-imaging is ON or the continuous-imaging is ON based on the single-imaging/continuous-imaging/self-timer setting. When the continuous-imaging is ON (NO in step S610), the processing returns to step S606 in which the system control unit 134 executes the release processing again. When the number of images to be captured in the continuous-imaging has been designated, the system control unit 134 executes the release processing in step S606 for the number of times corresponding to the number of images to be captured. When the system control unit 134 determines that the single-imaging is ON (YES in step S610), the processing returns to step S608.

In step S609, the system control unit 134 waits until the first shutter switch signal SW1 is turned OFF. When the first shutter switch signal SW1 is not turned OFF (NO in step S609), the processing stays in step S609. On the other hand, when the first shutter switch signal SW1 is turned OFF (YES in step S609), the system control unit 134 terminates the processing in the flowchart illustrated in FIG. 6, and returns to the calling source.

FIG. 7 illustrates a control flowchart of the panning imaging. The processing illustrated in FIG. 7 is implemented when the system control unit 134 loads a program corresponding to the flowchart illustrated in FIG. 7, stored in the nonvolatile memory 172, onto the system memory 174 and executes the program.

In step S701, the system control unit 134 waits until the first shutter switch signal SW1 is turned ON. When the system control unit 134 determines that the first shutter switch signal SW1 is turned ON (YES in step S701), the processing proceeds to step S702.

In step S702, the system control unit 134 stores the current single-imaging/continuous-imaging/self-timer setting value, and switches the setting to the setting value corresponding to the panning imaging. The switching processing is as described above in detail with reference to FIG. 5.

In step S703, the system control unit 134 executes the release processing according to the procedure described with reference to FIG. 6.

In step S704, the system control unit 134 restores the single-imaging/continuous-imaging/self-timer setting value stored in step S702, and the processing in FIG. 7 is terminated.

As described above, when the panning imaging is performed, the release setting value of the single-imaging/continuous-imaging/self-timer setting is temporarily saved and replaced with the setting value suitable for the panning imaging before the imaging starts, and is restored with the saved setting value when the panning imaging is completed. In this way, the user can perform the panning imaging suitable for the panning imaging, without doing a cumbersome procedure.

FIG. 8 is another control flowchart of the panning imaging. The processing illustrated in FIG. 8 is implemented when the system control unit 134 loads a program corresponding to the flowchart illustrated in FIG. 8, stored in the nonvolatile memory 172, onto the system memory 174 and executes the program.

In step S801, the system control unit 134 displays the panning imaging setting screen on the display unit 164. The user uses the operation unit 178 to turn ON or OFF the panning imaging setting on the panning imaging setting screen. When ON is set, the panning imaging assistance function is turned ON.

In step S802, the system control unit 134 determines whether the panning imaging setting has been turned ON in step S801. When the panning imaging setting is determined to be ON in step S802 (YES in step S802), the processing proceeds to step S803. In step S803, the system control unit 134 switches the single-imaging/continuous-imaging/self-timer setting through the procedure described with reference to FIG. 5. Then, the processing proceeds to step S804. When the system control unit 134 determines that the panning imaging is OFF in step S802 (NO in step S802), the processing proceeds to step S804.

In step S804, the system control unit 134 waits until the first shutter switch signal SW1 is turned ON. When the system control unit 134 determines that the first shutter switch signal SW1 is not turned ON (NO in step S804), the processing stays in step S804. When the system control unit 134 determines that the first shutter switch signal SW1 is turned ON (YES in step S804), the processing proceeds to step S805.

In step S805, the system control unit 134 executes the release processing according to the procedure described with reference to FIG. 6, and the processing illustrated in FIG. 8 is terminated.

The self-timer setting is turned OFF when the panning imaging setting is turned ON (activated). Thus, the user can perform the panning imaging without manually turning OFF the self-timer setting before the panning imaging is performed. Thus, the user can perform the panning imaging at the arbitrary timing, without being hindered by the self-timer setting.

FIG. 9 is a yet another control flowchart of the panning imaging. The processing illustrated in FIG. 9 is implemented when the system control unit 134 loads a program corresponding to the flowchart illustrated in FIG. 9, stored in the nonvolatile memory 172, onto the system memory 174 and executes the program.

In step S901, the system control unit 134 determines whether an operation of switching the imaging mode has been performed. The system control unit 134 displays a setting screen for imaging mode switching, on the display unit 164. The user switches the imaging mode by using a mode dial switch or the like of the operation unit 178. In the present exemplary embodiment, the imaging mode can be switched to any one of a plurality of imaging modes (e.g., the sub modes of the still image recording mode, each scene mode, and panning imaging mode). When the imaging mode is switched to the panning imaging mode, the panning imaging assistance function is activated. When the operation of switching the imaging mode is determined to have been performed in step S901 (YES in step S901), the processing proceeds to step S902. In step S902, the system control unit 134 switches the single-imaging/continuous-imaging/self-timer setting through the procedure illustrated in FIG. 5, and the processing proceeds to step S903. When the operation of switching the imaging mode is determined to have not been performed in step S901 (NO in step S901), the processing proceeds to step S903.

Thus, for example, when the imaging mode is switched to the panning imaging mode in a state where the self-timer setting is ON (self-timer imaging has been set) in an automatic imaging mode, the manual imaging mode, the aperture priority mode, the shutter speed priority mode, or the like, the self-timer setting is turned OFF through the processing in FIG. 5 (step S505 or S506), which is detail processing in step S902. This means that the user only needs to perform the operation of switching the imaging mode to the panning imaging mode, and needs not to perform the operation of changing the self-timer setting (needs no single/continuous/self-timer setting screen to be displayed), to achieve a state where an image is immediately captured, with no self-timer countdown, in response to the imaging instruction.

When the panning imaging mode is switched to another imaging mode (e.g., the automatic imaging mode, the manual imaging mode, the aperture priority mode, and the shutter speed priority mode), and if the self-timer setting has been ON before the panning imaging mode is set, the self-timer setting returns to be ON through the processing (step S503) in FIG. 5, which is detail processing in step S902.

For example, when the automatic imaging mode is switched to an imaging mode other than the panning imaging mode in a state where the self-timer setting is ON, the single/continuous/self-timer setting is unchanged as described in the processing (step S503) in FIG. 5, which is detail processing in step S902. For example, when the automatic imaging mode is switched to the manual imaging mode, the aperture priority mode, or the shutter speed priority mode in the state where the self-timer setting is ON (e.g., the 10 second self-timer has been set), the self-timer setting (the setting to perform the 10-second self-timer imaging) is maintained to be ON.

Predetermined setting items, other than the self-timer setting, are maintained in the panning imaging mode and some other imaging modes. For example, if a white balance is set to sun and the self-timer setting of 10 seconds is set to be ON while a first shooting mode, which is any one of the manual shooting mode, the aperture priority mode, and the shutter speed priority mode, and the first imaging mode is switched to a second imaging mode, which is any one of the manual imaging mode, the aperture priority mode, and the shutter speed priority mode different from the first imaging mode, the white balance is maintained to be sun and the self-timer setting of 10 second remains to be ON. In another case, if the white balance is set to sun and the self-timer of 10 second setting is set to be ON while the first imaging mode which is any one of the manual imaging mode, the aperture priority mode, and the shutter speed priority mode, and then the first imaging mode may be switched to the panning imaging mode, the white balance is maintained to be set to sun and the self-timer setting is turned OFF. Then, if the imaging mode may be switched again to any one of the manual imaging mode, the aperture priority mode, and the shutter speed priority mode, the white balance setting is maintained to be sun, and the self-timer setting of 10 seconds is restored. The user can select and set any one of setting values such as AWB, sun, shade, cloud, lightbulb, white fluorescent lamp, and manual as the white balance setting.

In step S903, the system control unit 134 waits until the first shutter switch signal SW1 is turned ON. When the first shutter switch signal SW1 is not turned ON (NO in step S903), the processing stays in step S903. On the other hand, when the system control unit 134 determines that the first shutter switch signal SW1 is turned ON (YES in step S903), the processing proceeds to step S904.

In step S904, the system control unit 134 executes the release processing through the procedure described with reference to FIG. 6, and then the processing illustrated in FIG. 9 is terminated.

The self-timer setting is deactivated when the panning imaging setting is turned ON (activated). Thus, the user can perform the panning imaging without manually deactivating the self-timer setting in advance. In this way, the panning imaging can be performed at a desired timing without being hindered by the self-timer setting.

In the present exemplary embodiment described above, the panning imaging assistance function is a function of slowing down the shutter speed (step S603) from that in the normal photometry processing (step S604). However, the panning imaging assistance function is not limited to this. For example, when the panning imaging is performed, an intentional framing movement direction of the digital camera 100 is determined based on at least one of the movement direction of the digital camera 100 detected by the attitude detection unit 186 and a result of analyzing the LV image at that time. For example, the intentional framing direction is determined to be a direction from left to right when the panning imaging is performed with the digital camera 100 panned from left to right to capture an image of a main object moving from left to right. In such a case, the panning imaging assistance function may be a function of performing image blur correction (image blur correction in an upper and lower direction) other than the intentional framing direction (left and right direction or horizontal direction). Alternatively, the panning imaging assistance function may be a function of more strongly correcting the image blur (image blur correction in the upper and lower direction) in the direction other than the intentional framing direction (left and right direction or horizontal direction), compared with the image blur correction in the intentional framing direction. Furthermore, when the panning imaging is performed, an object moving in the same direction as the digital camera 100 is extracted and determined as the main object, based on at least one of the movement direction of the digital camera 100 detected by the attitude detection unit 186 and the result of analyzing the LV image at that time. The panning imaging features vivid and lively expression (dynamic expression) with the main object not largely blurred but the background other than this object motion-blurred. However, it is difficult for the user to perform framing for following the main object at a speed perfectly synchronized with the movement of the main object, and thus the intentional framing direction might involve blurring of the main object. Therefore, the panning imaging assistance function may be an image blur correction for reducing image blurring of the extracted main object, also in the intended framing direction (left and right direction or horizontal direction). Further, the panning imaging assistance function may be a function of displaying an index such as a frame at a predetermined position in the imaging range, so that the user can more easily keep the main object in the imaging range when framing is performed.

The various types of control described above executed by the system control unit 134 may be implemented with a single hardware unit. Alternatively, the entire apparatus may be controlled with a plurality of hardware units cooperating to execute the processing.

The present invention is not limited to the particular exemplary embodiment described in detail above, and includes various modes within the scope of the present invention. The exemplary embodiments described above each are a just single exemplary embodiment of the present invention, and the exemplary embodiments may be combined as appropriate.

The exemplary embodiments described above are examples where the present invention is applied to an imaging apparatus. Alternatively, the present invention can be applied to devices having an imaging function with which the panning imaging can be performed and the self-timer can be set. The imaging mode can be switched to that for the panning imaging manually, automatically, or through a remote operation. For example, the present invention can be applied to a personal computer, a personal digital assistant (PDA), a mobile phone terminal, a mobile image viewer, a digital photo frame, a game console, an electronic book reader, a tablet terminal, a smartphone, a projection device with a camera, and the like.

In the exemplary embodiments described above, the self-timer setting is automatically canceled when the panning imaging is performed, and thus the panning imaging can be performed without being hindered by the self-timer setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-155232, filed Aug. 8, 2016, which is hereby incorporated by reference herein in its entirety.

What is claimed is:

1. An imaging apparatus comprising:
an imaging instruction member configured to issue an imaging instruction;
an image sensor configured to perform imaging in response to a reception of the imaging instruction issued by the imaging instruction member;
a memory and at least one processor which function as a switching unit configured to switch a panning imaging assistance function to be activated and deactivated; and
the memory and the at least one processor function as a control unit configured to perform control in such a manner that when the panning imaging assistance function that has been inactive is activated in a state where a self-timer setting is ON and the imaging instruction is received, the imaging is performed without counting down of a self-timer.

2. The imaging apparatus according to claim 1, wherein the panning imaging assistance function is activated in a case where an imaging mode of panning imaging has been set.

3. The imaging apparatus according to claim 2, wherein the control unit is configured to perform control in such a manner that in a case where a first imaging mode as one of a plurality of imaging modes is switched to a second imaging mode in a state where the self-timer setting is ON, the self-timer setting is maintained to be ON, and in a case where the first imaging mode is switched to an imaging mode of the panning imaging in the state where the self-timer setting is ON, the self-timer setting is turned OFF.

4. The imaging apparatus according to claim 2, wherein the control unit is configured to perform control in such a manner that in a case where a first imaging mode as one of a plurality of imaging modes is switched to a second imaging mode, a state where the self-timer setting and a second setting item different from the self-timer are set is maintained, and in a case where the first imaging mode is switched to an imaging mode of the panning imaging, the state where the second setting item is set is maintained and the self-timer setting is turned OFF.

5. The imaging apparatus according to claim 4, wherein the second setting item is a setting item for white balance.

6. The imaging apparatus according to claim 1, wherein the memory and the at least one processor function as a setting unit configured to set whether to perform the panning imaging,
wherein the panning imaging assistance function is activated in a case where the setting unit has set the panning imaging to be performed.

7. The imaging apparatus according to claim 1, further comprising a detector configured to detect a movement of the imaging apparatus,
wherein the panning imaging assistance function is activated when the detector has detected a movement of the imaging apparatus corresponding to the panning imaging.

8. The imaging apparatus according to claim 1, wherein the control unit is configured to maintain, in a case where the panning imaging assistance function that has been inactive is activated in a state where the self-timer setting is OFF and setting to perform single-imaging or continuous-imaging is ON, the setting to perform the single-imaging or continuous-imaging is maintained.

9. The imaging unit according to claim 1, wherein the control unit is configured to cancel the self-timer setting in a case where the panning imaging assistance function that has been inactive in a state where the self-timer setting is ON is activated.

10. The imaging apparatus according to claim 1, wherein the control unit is configured to restore the self-timer setting, when the panning imaging is terminated.

11. The imaging apparatus according to claim 1, wherein the self-timer setting is unable to be turned ON when the panning imaging assistance function is active.

12. The imaging apparatus according to claim 11, wherein the memory and the at least one processor function as a display control unit configured to perform control, when the panning imaging assistance function is active, so as to perform a guide display indicating that the panning imaging assistance function needs to be deactivated to turn ON the self-timer setting.

13. The imaging apparatus according to claim 1, wherein the panning imaging assistance function is a function of adjusting a shutter speed to be slow.

14. The imaging apparatus according to claim 1, wherein the panning imaging assistance function is at least one of a function of correcting image blur in a direction different from a framing direction of the imaging apparatus for the panning imaging, a function of correcting blur for a main object in the framing direction of the imaging apparatus for the panning imaging, and a function of displaying an index at a specific position in an imaging range.

15. A method for controlling an imaging apparatus, comprising:

receiving an imaging instruction;
switching a panning imaging assistance function to be activated or deactivated; and
performing control in such a manner that when the panning imaging assistance function that has been inactive is activated in a state where a self-timer setting is ON and the imaging instruction is received in a state where a self-timer setting is ON, the imaging is performed without counting down of a self-timer.

16. A non-transitory computer readable storage medium storing a program for causing a computer to function as units of the imaging apparatus according to claim 1.

* * * * *